US012125282B2

(12) United States Patent
Lau (10) Patent No.: US 12,125,282 B2
(45) Date of Patent: Oct. 22, 2024

(54) HAZARD NOTIFICATIONS FOR A USER (71) Applicant: Samsung Electronics Co., Ltd., Suwon-si (KR)

(72) Inventor: Jonathan Howkan Lau, San Mateo, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/203,313

(22) Filed: May 30, 2023

(65) Prior Publication Data

US 2024/0303989 A1 Sep. 12, 2024

Related U.S. Application Data (60) Provisional application No. 63/450,343, filed on Mar. 6, 2023.

(51) Int. Cl.
*G06V 20/50* (2022.01)
*G06F 3/01* (2006.01)
(Continued)

(52) U.S. Cl.
CPC .............. *G06V 20/50* (2022.01); *G06F 3/013* (2013.01); *G06T 7/0002* (2013.01); *G06T 7/521* (2017.01);
(Continued)

(58) Field of Classification Search
CPC ........ G06V 20/50; G06V 20/20; G06V 10/77; G06T 7/55; G06T 7/521; G06T 7/70; G06T 7/0002; G06T 7/73; G06T 11/00; G06T 2200/24; G06T 2207/20081; G06T 19/006; G06F 3/013; G08B 21/02; G02B 2027/0138; G02B 27/0093; G02B 27/01
(Continued)

(56) References Cited

U.S. PATENT DOCUMENTS 7,108,378 B1 * 9/2006 Maguire, Jr. ............ H04N 5/74
353/38
9,576,460 B2 2/2017 Dayal
(Continued)

FOREIGN PATENT DOCUMENTS

EP 2751775 B1 7/2016
KR 100405636 B1 11/2003

OTHER PUBLICATIONS

The Oscillation of Crystalline and Intraocular Lenses, ClinicalTrials. gov, identifier: NCT04274634, Sponsored by Anglia Ruskin University, first posted: Feb. 18, 2020.
(Continued)

*Primary Examiner* — Tom V Sheng (57) ABSTRACT

In one embodiment, a method includes accessing an image of a user's environment captured by a first camera and determining, based on the image of the user's environment, a potential hazard in the environment. The method further includes accessing an image of the user's eyes captured by a second camera and determining, based on the image of the user's eyes, a focal distance of the user. The method further includes determining whether the focal distance corresponds to the potential hazard and determining, based on the determination of whether the focal distance corresponds to the potential hazard, a hazard notification for the user.

20 Claims, 4 Drawing Sheets (51) Int. Cl.
| | |
|---|---|
| *G06T 7/00* | (2017.01) |
| *G06T 7/521* | (2017.01) |
| *G06T 7/55* | (2017.01) |
| *G06T 7/70* | (2017.01) |
| *G06T 11/00* | (2006.01) |
| *G06V 10/77* | (2022.01) |
| *G06V 20/20* | (2022.01) |
| *G08B 21/02* | (2006.01) |

(52) U.S. Cl.
CPC ............... *G06T 7/55* (2017.01); *G06T 7/70* (2017.01); *G06T 11/00* (2013.01); *G06V 10/77* (2022.01); *G06V 20/20* (2022.01); *G08B 21/02* (2013.01); *G06T 2200/24* (2013.01); *G06T 2207/20081* (2013.01)

(58) Field of Classification Search
USPC ........................................................ 345/156
See application file for complete search history.

(56) References Cited

U.S. PATENT DOCUMENTS

| | | | |
|---|---|---|---|
| 9,652,047 B2 | 5/2017 | Mullins | |
| 9,773,391 B1* | 9/2017 | Foshee | G01S 15/87 |
| 9,836,652 B2 | 12/2017 | Lection | |
| 10,122,985 B2 | 11/2018 | Stafford | |
| 10,134,279 B1 | 11/2018 | Toyoda | |
| 10,360,728 B2 | 7/2019 | Venkatesha | |
| 10,573,183 B1* | 2/2020 | Li | G07C 5/008 |
| 10,803,663 B2 | 10/2020 | Wang | |
| 10,948,983 B2* | 3/2021 | Suzuki | G06F 3/013 |
| 10,979,685 B1 | 4/2021 | Silverstein | |
| 11,361,512 B2* | 6/2022 | Chaurasia | G06N 5/04 |
| 11,428,955 B1* | 8/2022 | Lewis | G02C 7/101 |
| 11,442,534 B1 | 9/2022 | Douglas | |
| 2015/0185482 A1* | 7/2015 | Lewis | G02C 11/10 |
| | | | 345/157 |
| 2016/0343163 A1* | 11/2016 | Venkatesha | G01S 5/02 |
| 2017/0024933 A1* | 1/2017 | Shuster | B60R 1/00 |
| 2018/0191769 A1* | 7/2018 | Anderson | H04L 63/1441 |
| 2019/0224066 A1* | 7/2019 | Park | A61H 5/00 |
| 2019/0228263 A1* | 7/2019 | Szeto | G02B 27/017 |
| 2019/0272028 A1* | 9/2019 | Hong | G06T 7/70 |
| 2020/0026097 A1* | 1/2020 | Pinel | A61B 3/14 |
| 2020/0254876 A1* | 8/2020 | Cordell | H04N 7/181 |
| 2020/0312034 A1* | 10/2020 | Berthomier | G06T 19/006 |
| 2021/0019524 A1* | 1/2021 | Anderson | G06F 3/013 |
| 2021/0365685 A1* | 11/2021 | Shah | G06V 20/20 |
| 2022/0126837 A1* | 4/2022 | Croxford | B60W 50/16 |
| 2022/0207977 A1* | 6/2022 | Barkam | G01C 21/3461 |
| 2023/0351638 A1* | 11/2023 | Wu | G06V 10/25 |
| 2023/0377493 A1* | 11/2023 | Nicholls | G02B 27/0093 |

OTHER PUBLICATIONS

"A Hazard Detection and Tracking System for People with Peripheral Vision Loss using Smart Glasses and Augmented Reality", Younis et al., International Journal of Advanced Computer Science and Applications (Mar. 2019).

"PeerWell Launches Augmented Reality Trip and Fall Hazard Detector for Smartphones", Jasmine Pennic, HIT Consultant, Apr. 18, 2018.

"Augmented Reality Cues and Elderly Driver Hazard Perception", Mark C. Schall, Jr. et al., Human Factors: The Journal of the Human Factors and Ergonomics Society (https://www.ncbi.nlm.nih.gov/pmc/articles/PMC3875361/), Jun. 2013.

"US Army using Augmented Reality overlays in its research for the detection of roadside explosive hazards", Sam Sprig, Auganix (downloaded at https://www.auganix.org/us-army-using-augmented-reality-overlays-in-its-research-for-the-detection-of-roadside-explosive-hazards/), Jan. 23, 2021.

"Outdoor augmented reality for direct display of hazard information", Y. Mizuno et al., SICE 2004 Annual Conference, Aug. 2004.

"Hazard Avoidance System using Augmented Reality in Wearable Device", Kim et al., (downloaded at http://www.see.eng.osaka-u.ac.jp/seeit/icccbe2016/Proceedings/Full_Papers/196-290.pdf), Jul. 2016.

Verizon Augmented Manufacturing Safety, downloaded on Apr. 6, 2023 at https://www.verizon.com/business/resources/customer-success-stories/use-case-mec-and-manufacturing-safety/.

"The Effect of Mixed Reality Technologies for Falls Prevention Among Older Adults: Systematic Review and Meta-analysis", Nishchyk et al., JMIR Aging, Jun. 2021.

"Smart Assistive Technology for People with Visual Field Loss", Younis et al., University of Liverpool, Dec. 2019.

* cited by examiner

HAZARD NOTIFICATIONS FOR A USER

PRIORITY CLAIM

This application claims the benefit under 35 U.S.C. § 119 of U.S. Provisional Patent Application No. 63/450,343 filed Mar. 6, 2023, and incorporated by reference herein.

TECHNICAL FIELD

This application generally relates to hazard notifications for a user, particularly in augmented reality.

BACKGROUND

An augmented reality (AR) system can present images of a real-world scene that may include some AR content, such as a virtual object. For example, a user may view an image of real-world scene in their environment or may view such scene through, e.g., a transparent display, and virtual-reality content may be generated and displayed in that scene. An AR system may be a head-mounted display (HMD), such as a headset or a pair of glasses, through which a user views AR content. AR content may be integrated into may different kinds of applications, including but not limited to video games, e-commerce, social media, videoconferencing, messaging, and so forth. AR content, including the real-world scenes and/or the virtual content, may be presented in 2D or in 3D to a user.

DESCRIPTION OF EXAMPLE EMBODIMENTS

Potential hazards in a user's environment may create dangerous situations or cause injuries to the user. For example, uneven terrain (e.g., a pothole or object on a pathway) or the presence of objects (e.g., stationary objects, such as a post, or moving objects, such as a vehicle) in a user's environment may be potentially hazardous to the user. Hazards may create dangerous situations, for example by injuring the user if the user contacts the object or by causing the user to fall, which is a significant concern across the population and is particularly concerning for certain populations, such as the elderly. In particular, hazards in a user's environment may be dangerous because a user may not notice the hazard.

Figure 1:
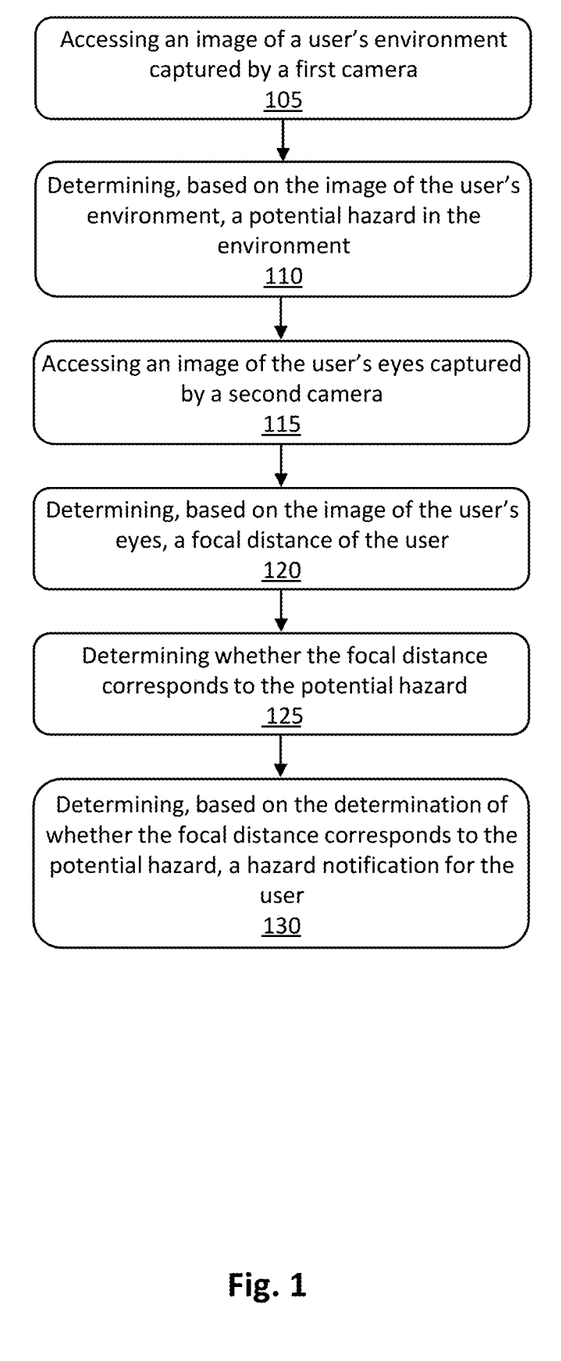
FIG. 1 illustrates an example method for determining hazard notifications for a user.
Figure 2:
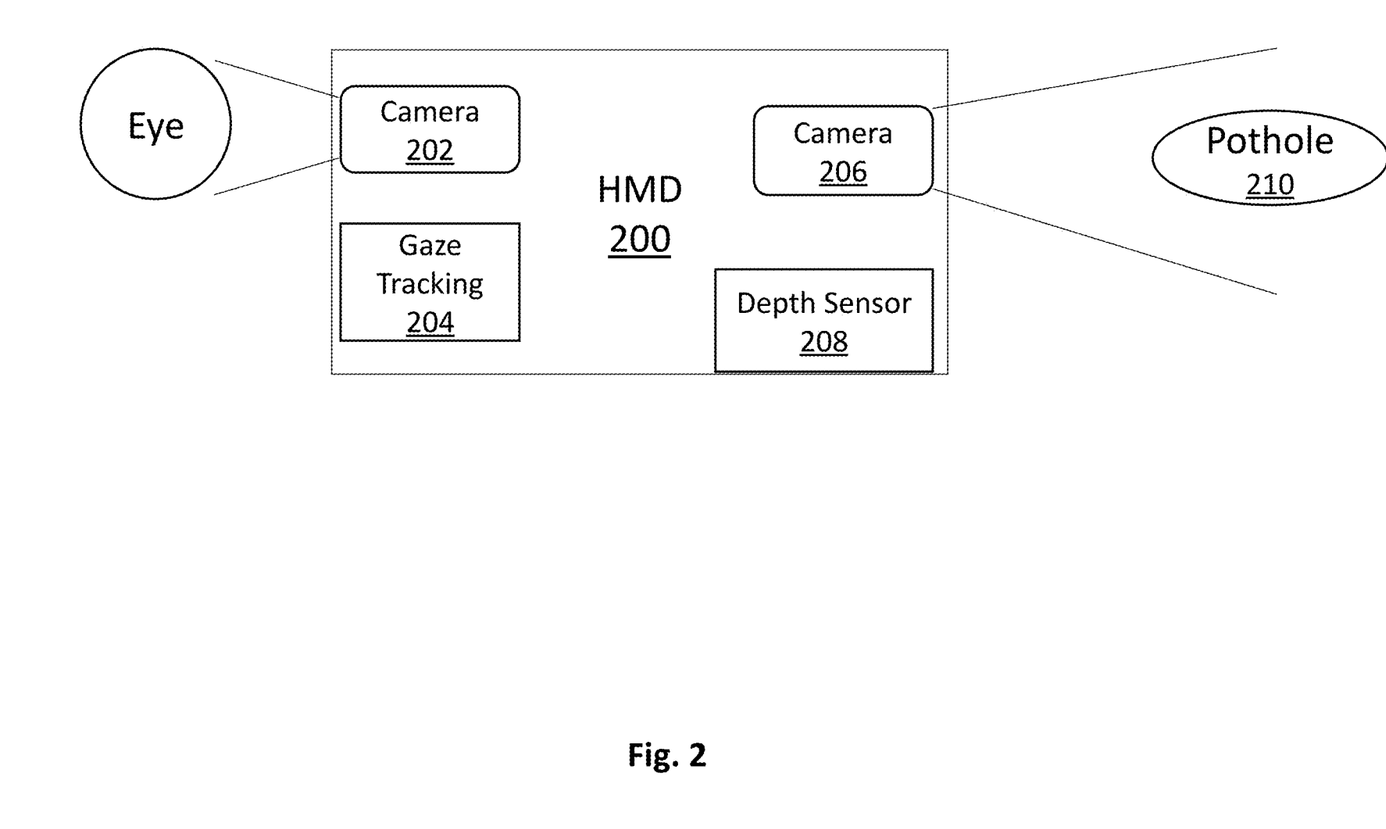
FIG. 2 illustrates an example architecture for performing the method of FIG. 1.

Embodiments of this disclosure increase a user's awareness of potential hazards in the user's environment by determining whether the user is aware of the hazard and providing hazard-related notifications that are based on the determination of whether the user is aware of the potential hazard. FIG. 1 illustrates an example method for determining hazard notifications for a user. FIG. 2 illustrates an example architecture for performing the method of FIG. 1 in the context of an HMD worn by the user. As explained more fully herein, an HMD worn by the user that has a display (e.g., AR glasses) can be a useful way for notifying a user of potential hazards because the device is capable of providing visual cues to the user, which in particular embodiments may include generating AR content as at least part of the notification. However, as explained more fully herein, hazard notifications are not limited to visual notifications and may include, e.g., audio or tactile notifications to the user.

Step 105 of the example method of FIG. 1 includes accessing an image of a user's environment captured by a first camera. In particular embodiments, the first camera may be a single camera, such as a single optical camera, or may include multiple cameras, such as for example a pair of stereoscopic cameras. In particular embodiments, accessing an image may include capturing the image. In particular embodiments, step 105 may be performed on a computing device that includes the camera. For example, FIG. 2 illustrates HMD 200 that includes one or more cameras 206 for capturing images of the user's physical environment. In particular embodiment, step 105 may be performed on a different computing device than the device that captured the image. For example, step 105 may be performed by a server computing device, or by a client computing device (e.g., a personal computer, smartphone, etc.) that is connected to a device that captured the image. In particular embodiments the accessed image may be a 2D image or may be a 3D image.

In the example of FIG. 2, camera 206 may include one or more cameras with a wide field of view, such as for example one or more cameras that have a field of view of 180 degrees. While the example of FIG. 2 illustrates a camera pointing in a particular direction relative to a user's eye, this disclosure contemplates that an HMD, and/or the one or more cameras used to capture the image in step 105 of the example method of FIG. 1, may capture images in any suitable direction relative to the user.

Step 110 of the example method of FIG. 1 includes determining, based on the image of the user's environment, a potential hazard in the environment. Step 110 may be performed by the device used to capture the image, e.g., by HMD 200 in the example of FIG. 2, or may be performed by a connected device, e.g., by a smartphone. The determination in step 110 happens substantially in real time so that potential hazards in the user's environment can be quickly detected before the user interacts with the hazard.

In particular embodiments, image recognition techniques may be used to identify a potential hazard from a captured image. For example, image features may be determined and compared to known features corresponding to known potential hazards. In particular embodiments, identifying potential hazards in an image may be performed by a machine-learning architecture trained on images of known hazards, which may be labelled as a potential hazards or as particular types of potential hazards. Potential hazards may be either stationary hazards or moving hazards, and in the latter case, a hazard's movement may be detected across a temporal sequence of images or may be detected by another sensor (e.g., by an acoustic sensor or a depth sensor on HMD 200 in the example of FIG. 2).

In particular embodiments, a depth sensor may be used to detect potential hazards. For instance, in the example of FIG. 2, HMD 200 includes depth sensor 208, which may capture depth information about the scene captured in images of the user's environment. The depth sensor may be used to identify where a discontinuity, such as an edge, occurs between objects in the user's environment. This process may also assist in the edge-detection process of identifying the edge of the hazard in order to highlight the outline of the potential hazard to a user, as discussed more fully below. In particular embodiments, a discontinuity detected by a depth sensor may include contrasting pixels or a sudden change in distance measured, which may indicate, e.g., an interface between different objects or a sudden change in elevation or in other environmental parameters. For instance, in the example of FIG. 2, information from camera 206 and depth sensor 208 may be used to detect the presence of a pothole 210, which may be sufficiently large and/or have an elevation change sufficient to be identified as a potential hazard.

In particular embodiments, a machine-learning architecture may be used to detect a potential hazard based on information (e.g., discontinuity information) from the depth sensor. For example, in particular embodiments, if a sufficient number of features associated with a portion of the user's environment match features of known potential hazards, then some or all of that portion may be identified as a potential hazard. Otherwise, in particular embodiments, the portion may not be categorized as a potential hazard at that time.

In particular embodiment, steps 105 and 110 may happen periodically, for example several times a second or every few seconds. In particular embodiments, the frequency of execution of these steps may depend on, e.g., the speed with which a user is moving. In particular embodiments, geofencing may be used to detect potential hazards in the user's environment. For example, if a user enters a geofenced zone associated with potential hazards (e.g., a zone identified as a construction zone), then steps 105 and 110 may be performed relatively more frequently.

As discussed more fully below, the example method of FIG. 1 determines a hazard notification for the user. In particular embodiment, a temporary hazard notification may be displayed until the determination in step 130 can be made. For example, an audio or visual alert may be provided to the user, such as a visual indicator pointing in the direction of the potential hazard and/or a highlighted outline of the potential hazard. This temporary hazard notification may be replaced by the hazard notification determined in step 130.

In particular embodiments, a detection of a potential hazard in step 110 triggers execution of steps 115-130. For instance, if a potential hazard is detected, then step 115 may be performed, or may be performed more frequently. In particular embodiments, steps 115-130 may be triggered based on additional information, such as information regarding the user's or object's (or both) direction and/or speed of travel, and/or based on the distance between the user and the potential hazard. For example, if a potential hazard in the user's environment is detected but the user is not moving or is moving away from the hazard, and, in particular embodiments, the potential hazard is relatively far from the user, then steps 115-130 may not be triggered as the potential hazard does not currently present a danger to the user.

In particular embodiments, detecting a potential hazard in an image may trigger additional sensors or functionality. For example, a portion of the user's environment identified as a potential hazard based on an image captured from a camera may cause a depth sensor having a field of view that includes the portion to begin capturing depth data.

Step 115 of the example method of FIG. 1 includes accessing an image of the user's eyes captured by a second camera. In particular embodiments, accessing an image may include capturing the image, as discussed above with respect to step 105.

Step 115 may include capturing one or more images that include the user's eyes. The images may be captured by a single camera (e.g., by an optical camera having a field of view that includes both of the user's eyes) or by separate cameras. The example architecture of FIG. 2 illustrates a camera 202 having a field of view that includes at least one eye of the user.

Human eyes include muscles and a lens (also referred to as a "crystalline lens") that control the depth of the user's focus, i.e., control how light from the user's environment is focused in the eye. For example, a relatively thinner lens is associated with a relatively farther focus, while a thicker lens caused by contraction of eye muscles is associated with a relatively closer focus. The image of the user's eyes captures an image of the lens shape for each eye. In particular embodiments, an ultrasonic camera or other, non-optical sensor may be used to capture an image of the user's eye, e.g., if ambient light conditions are too low for an optical camera to sufficiently capture the shape of a user's lens.

In particular embodiments, a sensor such as a camera may track movement of the user's eye (e.g., movement in the muscles that control the lens) over time in order to detect corresponding changes in focus of the user's vision over time. In particular embodiments, movement in the user's eye may indicate a change in lens shape in the user's eye, and thus a change of focus, and an image of the user's lens (and/or an image of the light-field map of the user's eye, as explained below) may be captured in response to the detected movement.

In particular embodiments, step 115 may include accessing a light-field map of light refracted off of a user's eye, as refraction is related to how the user's lens is focusing light in the user's eye. For example, a light field camera may be used to generate a refracted light field map of the user's eye. Thus, in particular embodiments, two separate kinds of measurements associated with the user's eye may be performed in step 115.

In particular embodiments, a direction of a user's gaze may be determined in addition to the focus of the user's vision. For example, HMD 200 in the example of FIG. 2 includes a gaze tracking sensor 204, which tracks the direction (but not depth) of the user's gaze, e.g., using eye tracking. Thus, the location of the user's gaze in 3D space (i.e., both direction and depth) can be determined.

In particular embodiments, step 115 may be repeated periodically, and may be updated substantially continuously over particular time periods. For example, step 115 may be repeated every second, depending on device capabilities, and the detection frequency may be changed (e.g., increased or decreased) based on how dangerous a potential hazard is, the relative speed, direction of movement, and distance of the user and the object, etc.

Step 120 of the example method of FIG. 1 includes determining, based on the image of the user's eyes, a focal distance of the user. The focal distance of the user represents the distance of the user's focus. In particular embodiments, step 120 includes determining the focal distance of the user based on the shape of the lenses in the user's eyes, based on the detected light refraction pattern, or both.

In particular embodiments, a machine-learning architecture is used to determine the focal distance of the user, taking the shape of the lens and/or the light refraction pattern as input. For example, one architecture may be trained on a first dataset containing images (or features extracted from such images) of lens shapes and corresponding focal distances. The user's lens shapes may then be input to this architecture, which outputs a focal distance for the user. As another example, a machine-learning architecture may be trained on a second dataset containing images of light refraction patterns (or features extracted from such patterns) and corresponding focal distances. The user's light refraction patterns may then be input to this architecture, which outputs another focal distance for the user. Eye-shape data capture by non-optical means may likewise be input to an associated trained machine-learning architecture that has been trained on that type of data.

In particular embodiments, some or all of the machine-learning architectures discussed above may be trained on a dataset that is not necessarily related to the user. In particular embodiments, some or all of these machine-learning architectures may be additionally or alternatively trained on data specific to the user. For instance, in the example of FIG. 2, a user may calibrate HMD 200 before use, such that HMD 200 (or a connected device) trains a machine-learning architecture by capturing data about the user's eyes while the user is looking at a known distance (e.g., as input by the user, or by instructing the user to look at an object at a known depth, etc.). This calibration process may determine what features associated with the user's lenses and/or refraction patterns look like at various focal distances.

In particular embodiments, a focal distance based on lens shape and a focal distance based on a light refraction pattern may be used as endpoints for a range of focal distances. The user's focal distance in step 120 may then be determined by the focal-distance range. For example, a user's lenses may correspond to a focal distance of 2.8 meters while the user's light refraction pattern corresponds to a focal distance of 2.9 meters, and therefore the user's focal distance may be determined in step 120 to be 2.8-2.9 meters. In particular embodiments, a confidence associated with one or more focal-distance determinations may be used to adjust a focal-distance range; e.g., a focal-distance determination associated with a relatively low confidence may be adjusted to increase the confidence.

Step 125 of the example method of FIG. 1 includes determining whether the focal distance corresponds to the potential hazard. The focal distance of the user corresponds to the potential hazard when the user is determined to be looking at the potential hazard.

For example, depth data from a depth sensor and the user's focal distance, such as the focal-distance range, may be compared. The user's gaze direction may also be compared to the relative direction of the potential hazard from the user. If the user is both looking in the direction of the potential hazard and the distance of the hazard from the user is the same as the user's focal distance or is within the user's focal-distance range (or within a tolerance associated with such distance or range), then the user's focal distance corresponds to the potential hazard, strongly indicating that the user is looking at, and thus aware of, the potential hazard. In this example, if the distance between the user and the object is different than the user's focal distance or outside of the user's focal-distance range, or if the user is not looking in the direction of the potential hazard, then the user's focal distance does not correspond to the potential hazard.

In particular embodiments, in AR applications one or more virtual objects may be presented along with images or views of the user's environment. Particular embodiments may determine whether a virtual object is presented that occludes the user's view of a potential hazard. For example, if a virtual object is displayed on a display in front of, and therefore occluding, a potential hazard, then the user's focal distance does not correspond to the potential hazard.

Step 130 of the example method of FIG. 1 includes determining, based on the determination of whether the focal distance corresponds to the potential hazard, a hazard notification for the user. For example, if the focal distance of the user does not correspond to the potential hazard, and the potential hazard is within a threshold distance (e.g., 3 meters) from the user, then a hazard notification such as a sound and/or a visual cue may be provided to the user. If the potential hazard is farther than a threshold distance or, in some embodiments, if the user's focal distance corresponds to the potential hazard, then a more subtle notification may be provided, or step 130 may include providing no hazard notification to the user. As explained herein, the type of hazard notification, or whether to provide a hazard notification, may be based on additional information such as the distance between the user and the potential hazard, whether the user is moving toward the potential hazard, etc.

A hazard notification can vary based on one or more factors, including factors indicating a danger a potential hazard presents to a user. For example, step 130 may include determining that the hazard notification to be provided is no hazard notification when any or some of: (1) the user's focal distance corresponds to the potential hazard; (2) the distance between the hazard and the user (e.g., as determined by a depth sensor) is greater than a distance threshold; or (3) the user is not moving toward the potential hazard, or is not moving toward the potential hazard with sufficient speed. In particular embodiments, a distance threshold or other threshold related to whether to provide a hazard notification or how that notification should be provided may be based on other factors, such as a dangerousness of the hazard and/or the relative motion of the hazard and the user.

In particular embodiments, step 130 may include determining a first hazard notification when the user's focal distance corresponds to the potential hazard (indicating that the user is aware of the hazard) and the distance between the user and the hazard is less than a distance threshold, which distance threshold may vary based on, e.g., the relative motion of the user and the hazard or the dangerousness of the hazard. In particular embodiments, a first hazard notification may be more subtle then a second hazard notification (or other hazard notifications) that occur when a user is determined not to be focusing on or aware of the potential hazard. For example, a first hazard notification may be a relatively soft sound, such as a chime. As another example, a first hazard notification may be a visual cue, such as highlighting of an outline or edge of the potential hazard. For example, if a user is wearing an HMD, then the edge of a potential hazard displayed on the display of the HMD may be emphasized. The amount of emphasis may depend on, e.g., the distance between the hazard and the user, the length of time the user's focal length has corresponded to the potential hazard, the past history of the user's awareness of the potential hazard (e.g., if the user's focal distance has previously corresponded to the same potential hazard), etc. In particular embodiments, a first hazard notification may alternatively or additionally include a hazard label, such as an icon indicating a hazard or an arrow pointing at or toward the hazard. Particular embodiments may provide a first hazard notification (as opposed to a second hazard notification) when the user's focal length corresponds to a potential hazard for more than a threshold time (e.g., 1 second), indicating that the user has actually focused on the potential hazard.

Figure 3:
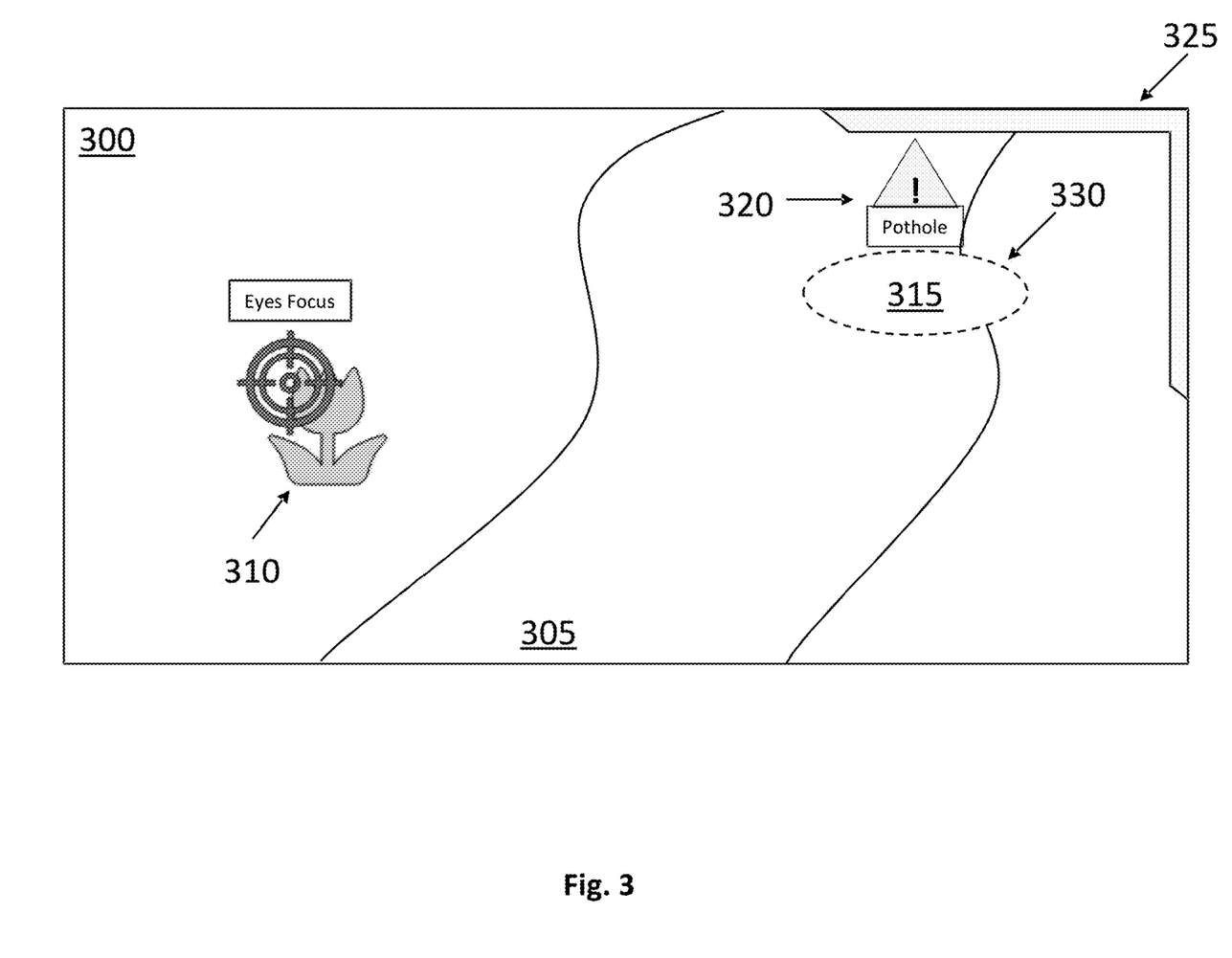
FIG. 3 illustrates an example user interface that provides visual hazard notifications.

In particular embodiments, step 130 may include determining a second hazard notification when the user's focal distance does not correspond to the potential hazard (indicating that the user is not aware of the hazard) and the distance between the user and the hazard is less than a distance threshold, which distance threshold may vary based on, e.g., the relative motion of the user and the hazard or the dangerousness of the hazard. In particular embodiments, a second hazard notification may be more conspicuous or noticeable than a first hazard notification. FIG. 3 illustrates an example user interface 300 that provides such visual hazard notifications. In the example of FIG. 3, a user is moving along a pathway 305 that includes a potential hazard 315 (e.g., a pothole) and the user's focal distance does not correspond to potential hazard, for instance because the user is focusing instead on object 310. Depending on, for example, the distance between the user and potential hazard 315 and the motion of the user relative to the hazard, step 130 may include providing a second hazard notification to the user. For example, the hazard notification may include a visual alert 320, which may include a hazard-related icon and/or a textual description of the hazard. The second hazard notification may include an emphasis on the edge 330 of the potential hazard, such as a coloration or highlighting of the edge. The second hazard notification may include a visual indication 325 on a portion of the UI, such as a corner of the UI, indicating the area in which the potential hazard occurs. In particular embodiments, the second notification may increase in conspicuousness if, after providing the second notification, the user's focal distance still does not correspond to the potential hazard. For example, additional visual content may then be added, or existing content may change in size, color, emphasis, etc.

In particular embodiments, a hazard notification may be reduced or removed when a user's focal distance changes states from not corresponding to a potential hazard to corresponding to the potential hazard, indicating that the user has become aware of the potential hazard. For instance, in the example of FIG. 3, if a user's focal distance subsequently corresponds to potential hazard 315 (as determined, for example, by repeating steps 115-130 of the example method of FIG. 1), then the second hazard notification may change to a first hazard notification (e.g., elements 320 and 325 may be removed, leaving only an emphasized edge 330), or no notification may be provided to the user. In particular embodiments, such changes may require a user's focal distance to correspond to the potential hazard for at least a threshold period of time, in order to ensure that a user has actually acknowledged the potential hazard. In particular embodiments, a user can adjust settings related to hazard notifications, such as for example, the types of notifications, the relative motion or distance required to trigger hazard notifications, a threshold period of time for determining whether a user has acknowledged a potential hazard, whether any notifications should be displayed when a user's focal distance corresponds to a potential hazard, and in particular embodiments such settings may be specific to particular kinds or classes of hazards (e.g., as categories by hazard type, hazard size or motion, the dangerousness of a hazard, etc.).

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 4, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 4, by a processor coupled to non-transitory computer readable storage media, or any suitable combination thereof.

Embodiments herein may be used in wide variety of settings to alert users of potential hazards in their environment. For example, a user may be using an application on an HMD, such as a web-browsing application or a text-messaging application, while walking such that their focus is on the application rather than on their surroundings. Likewise, a user moving around while on a video call may not be focused on their environment, and similarly a user exercising (e.g., running) may be focused on an application (e.g., a navigational application, or a motivational application, etc.) and therefore not notice potential hazards in their environment.

A user may not notice aspects of their surroundings even when the user is not distracted by virtual content. For example, a user who is sightseeing or watching an event or activity nearby may not notice potential hazards in their environment. In addition, some hazards are transient and may appear suddenly, and a user may not notice such hazards before they represent a danger to the user.

As another example, some users, such as elderly persons, may have degraded vision, and therefore may have difficulty seeing potential hazards in their environment. As another example, people may work in situations that contain safety hazards (e.g., in a warehouse), and their tasks may require focus that does not permit the user to be fully aware of their surroundings, and notifying such users of potential hazards may prevent dangerous situations. Moreover, residential homes and commercial business also include potential hazards (e.g., slippery surfaces, uneven surfaces, stairs, etc.), and notifying such users of potential hazards may prevent dangerous situations.

Figure 4:
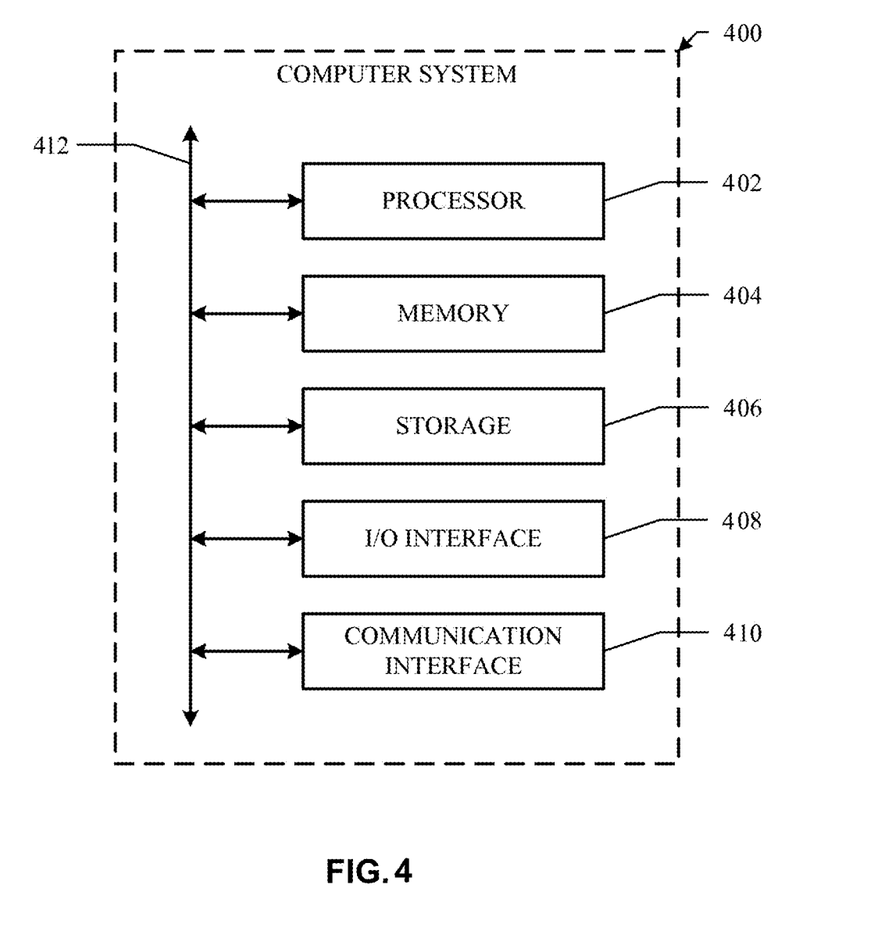
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   accessing an image of a user's environment captured by a first camera;
   determining, based on the image of the user's environment, a potential hazard in the environment;
   accessing an image of the user's eyes captured by a second camera;
   determining, based on the image of the user's eyes, a focal distance of the user;
   determining a direction of a gaze of the user relative to a direction of the potential hazard from the user;
   determining whether the focal distance corresponds to the potential hazard based on (1) the determined focal distance of the user (2) a distance between the user and the potential hazard and (3) the direction of the gaze of the user relative to the direction of the potential hazard from the user; and
   determining, based on the determination of whether the focal distance corresponds to the potential hazard, a hazard notification for the user.

2. The method of claim 1, wherein the potential hazard is determined based on image recognition from a set of predetermined hazards.

3. The method of claim 1, wherein the potential hazard is determined based on a change in elevation in the user's environment.

4. The method of claim 1, wherein determining the focal distance of the user comprises determining, based on the image of the user's eyes, the focal distance based on a shape of a lens of at least one of the user's eyes.

5. The method of claim 1, wherein determining the focal distance of the user comprises determining, based on the image of the user's eyes, the focal distance based on a light refraction pattern from at least one of the user's eyes.

6. The method of claim 1, wherein the second camera comprises an optical camera and a light refraction camera, and determining the focal distance of the user comprises:
   determining, based on an image from the optical camera, a shape of a lens of the user's eye; and determining, based on an image from the light refraction camera, a light refraction pattern from the user's eye;

determining a first focal distance of the user based on the shape of the lens; and determining a second focal distance of the user based on the light refraction pattern, wherein the focal distance of the user comprises a focal-distance range bounded by the first focal distance and the second focal distance.

7. The method of claim 6, wherein the first focal distance is determined by a first machine-learning model trained on a plurality of known lens shapes and corresponding focal distances, and wherein the second focal distance is determined by a second machine learning model trained on a plurality of known eye refraction patterns and corresponding focal distances.

8. The method of claim 6, wherein determining whether the focal distance corresponds to the potential hazard comprises determining whether a distance between the user and the potential hazard is within the focal-distance range.

9. The method of claim 1, wherein determining the hazard notification for the user is further based on the distance between the user and the potential hazard.

10. The method of claim 9, further comprising:
determining that no hazard notification should be provided when the distance between the user and the potential hazard is greater than a threshold distance;
determining that a first hazard notification should be provided when the distance between the user and the potential hazard is less than a threshold distance and the focal distance of the user corresponds to the potential hazard; and
determining that a second hazard notification should be provided when the distance between the user and the potential hazard is less than the threshold distance and the focal distance of the user does not correspond to the potential hazard.

11. The method of claim 10, further comprising determining that no hazard notification should be provided when a direction of the user's movement is not toward the potential hazard.

12. The method of claim 10, further comprising determining that a third hazard notification should be provided after the second hazard notification when the user's focal distance corresponds to the potential hazard.

13. The method of claim 1, wherein the hazard notification is based on a speed of the user relative to the potential hazard.

14. The method of claim 1, further comprising displaying, on a display of a head-mounted display worn by the user, the hazard notification to the user, wherein the hazard notification comprises augmented-reality content.

15. The method of claim 14, wherein the head-mounted display further comprises the first camera and the second camera.

16. The method of claim 1, wherein the hazard notification comprises a sound.

17. One or more non-transitory computer readable storage media embodying instructions and coupled to one or more processors that are operable to execute the instructions to:
access an image of a user's environment captured by a first camera;
determine, based on the image of the user's environment, a potential hazard in the environment;
access an image of the user's eyes captured by a second camera;
determine, based on the image of the user's eyes, a focal distance of the user;
determine a direction of a gaze of the user relative to a direction of the potential hazard from the user;
determine whether the focal distance corresponds to the potential hazard based on (1) the determined focal distance of the user (2) a distance between the user and the potential hazard and (3) the direction of the gaze of the user relative to the direction of the potential hazard from the user; and
determine, based on the determination of whether the focal distance corresponds to the potential hazard, a hazard notification for the user.

18. A head-mounted display system comprising:
a first camera;
a second camera;
a display;
one or more non-transitory computer readable storage media embodying instructions; and
one or more processors coupled to the non-transitory computer readable storage media, the one or more processors being operable to execute the instructions to:
access an image of a user's environment captured by the first camera;
determine, based on the image of the user's environment, a potential hazard in the environment;
access an image of the user's eyes captured by the second camera;
determine, based on the image of the user's eyes, a focal distance of the user;
determine a direction of a gaze of the user relative to a direction of the potential hazard from the user;
determine whether the focal distance corresponds to the potential hazard based on (1) the determined focal distance of the user (2) a distance between the user and the potential hazard and (3) the direction of the gaze of the user relative to the direction of the potential hazard from the user; and
determine, based on the determination of whether the focal distance corresponds to the potential hazard, a hazard notification for the user.

19. The system of claim 18, wherein the hazard notification comprises augmented-reality content displayed on the display of the head-mounted display.

20. The system of claim 18, wherein the second camera comprises an optical camera and a light refraction camera, and determining the focal distance of the user comprises:
determining, based on an image from the optical camera, a shape of a lens of the user's eye; and
determining, based on an image from the light refraction camera, a light refraction pattern from the user's eye;
determining a first focal distance of the user based on the shape of the lens; and
determining a second focal distance of the user based on the light refraction pattern, wherein the focal distance of the user comprises a focal-distance range bounded by the first focal distance and the second focal distance.

* * * * *